United States Patent
Zhang et al.

(10) Patent No.: US 9,621,019 B2
(45) Date of Patent: Apr. 11, 2017

(54) INDIRECT REGULATION OF OUTPUT CURRENT IN POWER CONVERTER

(71) Applicant: Power Integrations, Inc., San Jose, CA (US)

(72) Inventors: Michael Yue Zhang, Mountain View, CA (US); Ricardo Luis Janezic Pregitzer, Campbell, CA (US); Mingming Mao, Saratoga, CA (US); Tiziano Pastore, Los Gatos, CA (US)

(73) Assignee: Power Intergrations, Inc., San Jose, CA (US)

(*) Notice: Subject to any disclaimer, the term of this patent is extended or adjusted under 35 U.S.C. 154(b) by 112 days.

(21) Appl. No.: 14/678,821

(22) Filed: Apr. 3, 2015

(65) Prior Publication Data
US 2016/0134182 A1    May 12, 2016

Related U.S. Application Data

(60) Provisional application No. 62/076,981, filed on Nov. 7, 2014.

(51) Int. Cl.
*H02M 1/00*    (2006.01)
*H02M 3/26*    (2006.01)
(Continued)

(52) U.S. Cl.
CPC .......... *H02M 1/00* (2013.01); *H02M 3/00* (2013.01); *H02M 3/26* (2013.01); *H05B 33/0818* (2013.01); *H02M 2001/0009* (2013.01)

(58) Field of Classification Search
CPC .. H02M 1/00; H02M 2001/0009; H02M 3/00; H02M 3/26
See application file for complete search history.

(56) References Cited

U.S. PATENT DOCUMENTS 7,042,181 B2 * 5/2006 Nagakura ............... H02M 7/48
                                                        318/434
7,288,924 B2   10/2007 Trandafir et al.
(Continued)

FOREIGN PATENT DOCUMENTS

EP    2259418 A1    12/2010
EP    2779402 A2    9/2014

OTHER PUBLICATIONS

European Patent Application No. 15193247.2—Extended European Search Report, dated Apr. 5, 2016 (7 pages).

*Primary Examiner* — Jessica Han
*Assistant Examiner* — Demetries A Gibson
(74) *Attorney, Agent, or Firm* — Blakely Sokoloff Taylor & Zafman LLP (57) ABSTRACT

A controller includes a multiplier block that is coupled to receive an input voltage signal, an input current signal, and an output voltage signal that are representative of a power conversion system. The multiplier block outputs a multiplier block output signal responsive to a product of the input voltage signal and the input current signal divided by the output voltage signal. A signal discriminator outputs a error signal responsive to the multiplier block output signal. The error signal is representative of a difference between a portion of the multiplier block output signal that is greater than a reference signal and a portion of the multiplier block output signal that is less than or equal to the reference signal. A switch controller generates a drive signal responsive to the error signal to control switching of a power switch to regulate an average output current of the power conversion system.

20 Claims, 5 Drawing Sheets

(51) Int. Cl.
*H02M 3/00* (2006.01)
*H05B 33/08* (2006.01)

(56) References Cited

U.S. PATENT DOCUMENTS

| | | | |
|---|---|---|---|
| 7,342,812 B2 | 3/2008 | Piper et al. | |
| 7,525,823 B2 | 4/2009 | Piper et al. | |
| 8,098,506 B2* | 1/2012 | Saint-Pierre | H02M 1/425 363/21.12 |
| 8,379,419 B2* | 2/2013 | Yabuzaki | H02M 1/32 323/901 |
| 8,630,105 B2* | 1/2014 | Uno | H02M 1/36 323/299 |
| 9,052,728 B2* | 6/2015 | Chen | H02M 1/32 |
| 2005/0068796 A1* | 3/2005 | Morita | H02M 1/4225 363/120 |
| 2007/0069581 A1* | 3/2007 | Mino | H02M 1/42 307/12 |
| 2010/0302811 A1* | 12/2010 | Saint-Pierre | H02M 1/425 363/21.01 |
| 2013/0308358 A1* | 11/2013 | Usami | H02M 7/04 363/84 |
| 2014/0008983 A1* | 1/2014 | Miyauchi | H01L 31/02021 307/52 |

* cited by examiner

INDIRECT REGULATION OF OUTPUT CURRENT IN POWER CONVERTER

CROSS-REFERENCE TO RELATED APPLICATIONS

This application claims the benefit of U.S. Provisional Application No. 62/076,981 filed on Nov. 7, 2014, the contents of which are incorporated herein by reference.

BACKGROUND INFORMATION

Field of the Disclosure

The present invention relates generally to power conversion systems, and in particular but not exclusively, relates to regulation of an output current in a power conversion system.

Background

Operation of a power conversion system is usually controlled by a controller that may be designed as an integrated circuit module that includes sensors to regulate the output of the power conversion system. A common example of a power conversion system may include a switched mode power converter, and can be used in a wide variety of applications such as battery chargers or power supplies for electronic devices. The controllers generate control signals for the active elements/components of the power conversion systems to regulate the output in response to sensed information. For instance, if the controller is regulating the output current of a power conversion system, the output current is typically measured across a sense element, typically a resistor, that is coupled to the output of the power conversion system to sense the output current conducted through the power conversion system output terminals.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

Figure 1:
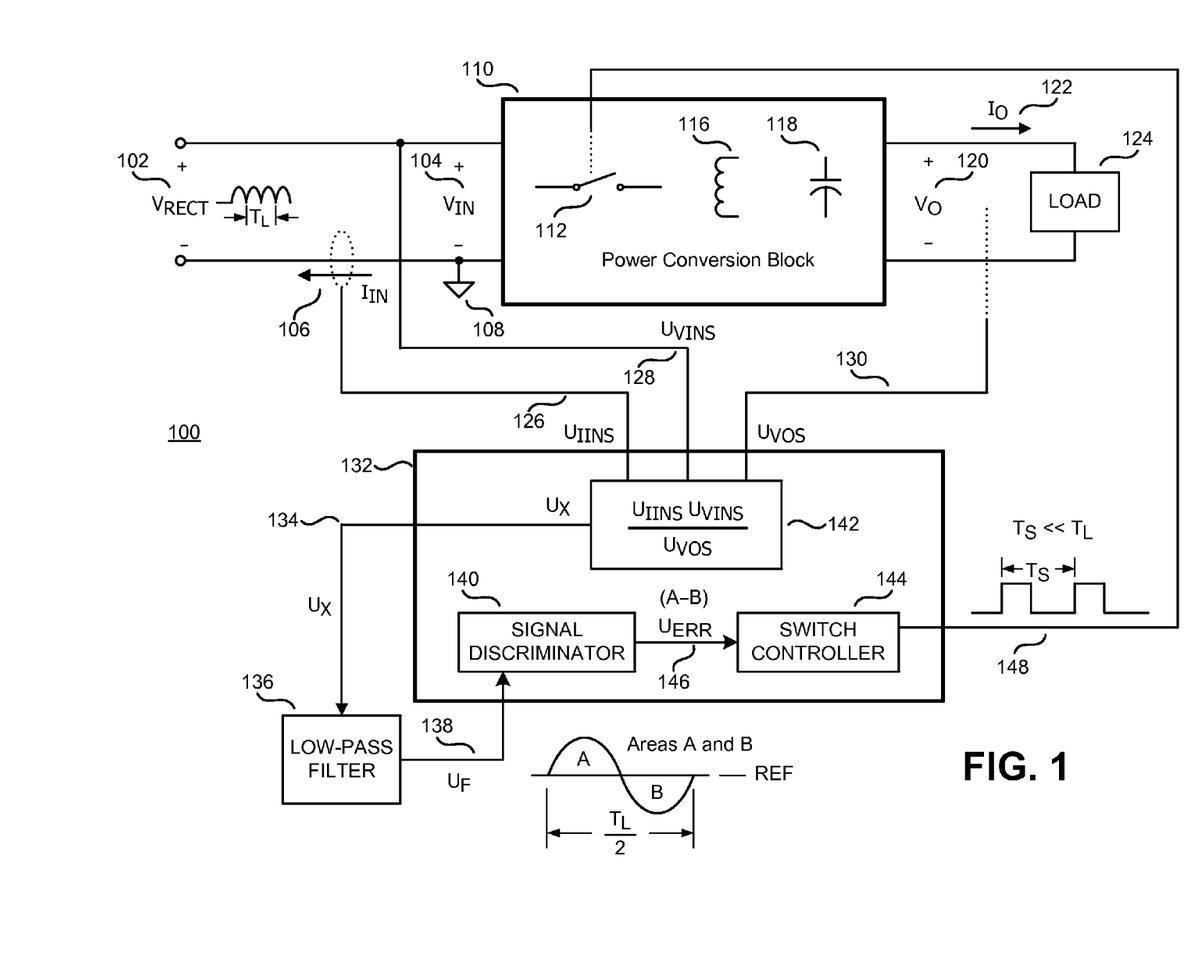
FIG. 1 is a block diagram illustrating an example power conversion system with a controller that regulates output current indirectly in response to the input voltage, input current, and output voltage in accordance with the teachings of the present disclosure.

As will be shown, an example controller for use in a power conversion system regulates an output current of the power conversion system without having to sense the output current directly, which can be difficult and is often performed by having to sense the output current with an output current sense resistor. Instead, an example controller in accordance with the teachings of the present invention regulates the output current of a power conversion system indirectly in response to the input voltage, input current, and output voltage. To illustrate, FIG. 1 shows an example power conversion system 100 that receives an input voltage $V_{IN}$ 104 to produce an output voltage $V_O$ 120 and an output current $I_O$ 122 at a load 124. In one example, power conversion system 100 is an ac-dc power converter, where input voltage $V_{IN}$ 104 is a rectified and filtered ac input voltage $V_{RECT}$ 102 received from an input voltage source (not shown).

Power conversion system 100 includes a power conversion block 110 that is controlled by a controller 132 to regulate output current $I_O$ 122. Power conversion block 110 typically includes at least one switch 112, at least one inductor 116, and at least one capacitor 118. Power conversion block 110 can be configured to be one of many variants of a Buck converter by arranging the switches, inductors, and capacitors of power conversion block 110 accordingly. It should be noted that power conversion block 110 can also be configured in other converter topologies such as a flyback converter.

Controller 132 receives an input current sense signal $U_{INS}$ 126 that is representative of input current $I_{IN}$ 106, an input voltage sense signal $U_{VINS}$ 128 that is representative of input voltage $V_{IN}$ 104, and an output voltage sense signal $U_{VOS}$ 130 that is representative of output voltage $V_O$ 120. Controller 132 outputs a drive signal 148 to control the switching of switch 112 of power conversion block 110. Drive signal 148 is a logic signal that may be logic high or low during a switching period TS. Switch 112 may be closed when drive signal 148 is logic high, and switch 112 may be open when drive signal 148 is logic low. A closed switch may also be referred to as being in an ON state. An open switch may also be referred to as being in an OFF state.

In one example, switch 112 is a metal oxide semiconductor field effect transistor (MOSFET). In another example, controller 132 may be implemented as a monolithic integrated circuit or may be implemented with discrete electrical components or a combination of discrete and integrated components. Controller 132 and switch 112 could form part of an integrated circuit that is manufactured as either a hybrid or a monolithic integrated circuit.

In the illustrated example, power conversion system 100 can include one or more sensing circuitry to sense input voltage $V_{IN}$ 104, and output voltage $V_O$ 120 and produce input voltage sense signal $U_{VINs}$ 128, and output voltage sense signal $U_{VOS}$ 130. Any one of a variety of ways to sense current, such as for example receiving the voltage across a resistor conducting the current, or for example receiving a scaled current from a current transformer, or for example receiving the voltage across the on-resistance of a metal oxide semiconductor field-effect transistor (MOSFET) that conducts the current, may be used to sense input current $I_{IN}$ 106 and to provide input current sense signal $U_{INS}$ 126 to controller 132.

Controller 132 includes a computational unit 142, which may also be referred to as a multiplier 142, a signal discriminator 140, and a switch controller 144. Multiplier 142 receives input voltage sense signal $U_{VINS}$ 128, input current sense signal $U_{INS}$ 126, and output voltage sense signal $U_{VOS}$ 130. A signal $U_X$ 134, which is output by multiplier 142, is representative of the product of input voltage sense signal $U_{VINS}$ 128 and input current sense signal $U_{INS}$ 126 divided by output voltage sense signal $U_{VOS}$ 130. In some examples, for example when power conversion system 100 is used as an LED driver to provide power to one or more LEDs, an average value of signal $U_X$ 134 may be equal to the average value of output current $I_O$ 122 during regulation.

Low-pass filter 136 receives signal $U_X$ 134 and outputs a filtered signal $U_F$ 138, which is a low-pass filtered version of signal $U_X$ 134. Filtered signal $U_F$ 138 has the same average value as that of signal $U_X$ 134. Low-pass filter 136 may be a part of controller 132 or may be outside of controller 132. As illustrated, rectified input voltage $V_{RECT}$ 102 can be periodic with a period $T_L/2$, which may also be referred to as a half line cycle. In some cases, output current $I_O$ 122 can also be periodic with a period equal to the half line cycle. Cut-off frequency of low-pass filter 136 can be adjusted to remove frequency components in signal $U_X$ 134 that are greater than the frequency of output current $I_O$ 122 (inverse of period $T_L/2$) such that filtered signal $U_F$ 138 is periodic with approximately the same period as that of output current $I_O$ 122. Therefore, in the absence of a direct measurement of output current $I_O$ 122, regulation of the average value of output current $I_O$ 122 can be achieved by regulating the average value of filtered signal $U_F$ 138 in accordance with the teachings of the present invention.

Signal discriminator 140 receives filtered signal $U_F$ 138 and outputs an error signal $U_{ERR}$ 146 that may represent—for one or more periods of filtered signal $U_F$ 138—the difference between the duration that filtered signal $U_F$ 138 is greater than a reference REF and the duration that filtered signal $U_F$ 138 is less than the reference REF. The reference REF may correspond to the desired average value of output current $I_O$ 122. In some cases, error signal $U_{ERR}$ 146 may also be representative—for one or more periods of filtered signal $U_F$ 138—of the difference between the area of the portion of filtered signal $U_F$ 138 that is greater than the reference REF, which is denoted by area A, and the area of the portion of filtered signal $U_F$ 138 that is less than the reference REF, which is denoted by area B. In both cases, error signal $U_{ERR}$ 146 may indicate whether the average value of filtered signal UF 138 is above or below the reference REF. For example, a positive value for error signal $U_{ERR}$ 146 may mean that the average value of filtered signal $U_F$ 138 is above the reference REF and a negative value for error signal $U_{ERR}$ 146 may mean that the average value of filtered signal $U_F$ 138 is below the reference REF.

Switch controller 144 receives error signal $U_{ERR}$ 146 and outputs drive signal 148. Switch controller 144 can adjust one or more properties of drive signal 148 such as, switching period $T_s$, the on-time (i.e., the portion of switching period $T_s$ that drive signal 148 is logic high), etc., in response to error signal $U_{ERR}$ 146. As an example, in response to error signal $U_{ERR}$ 146 indicating that the average value of filtered signal $U_F$ 138 is below the reference REF, switch controller 144 can increase the on-time of drive signal 148 to increase the energy delivered to load 124, thereby increasing output current $I_O$ 122.

Figure 2:
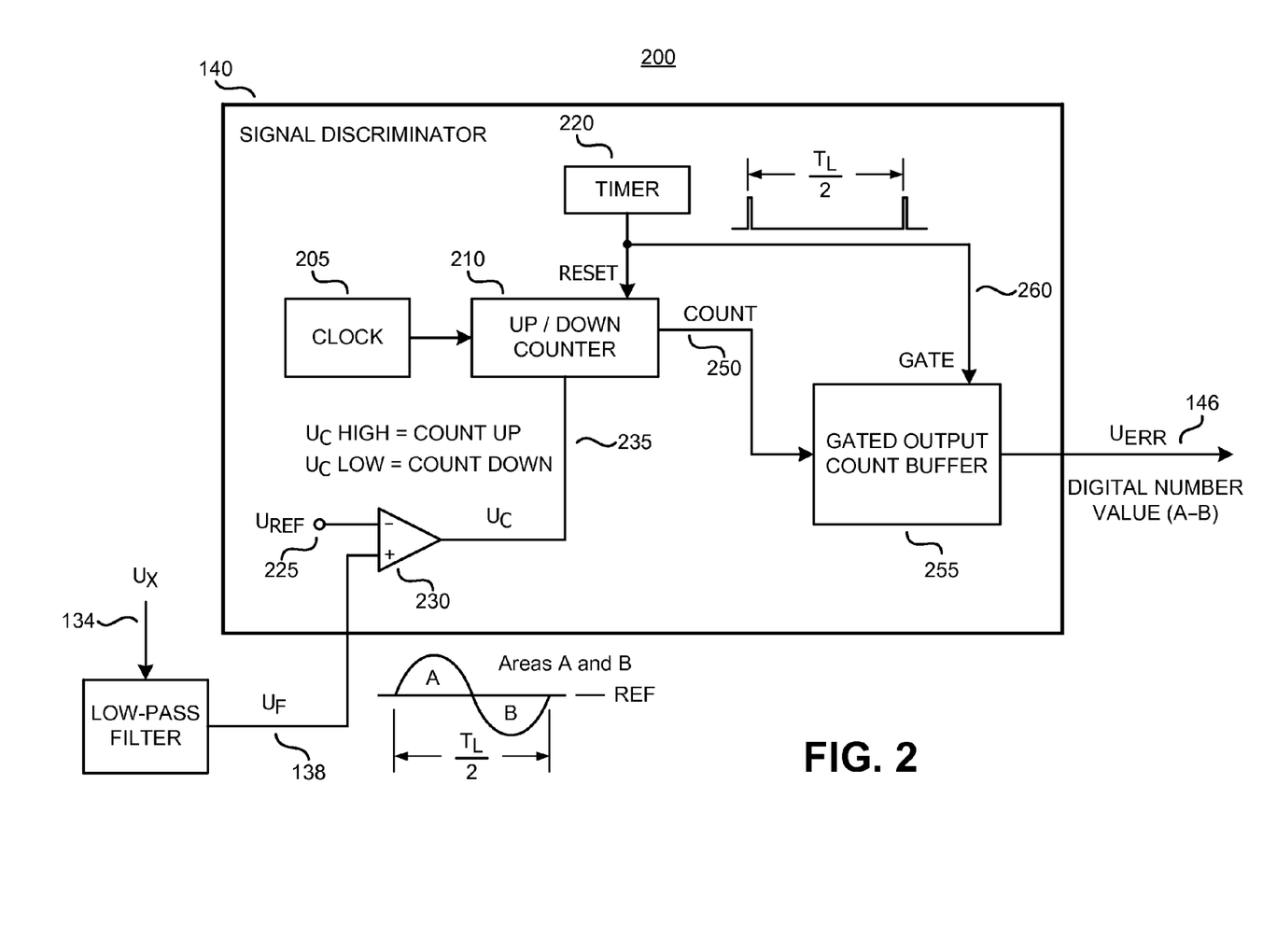
FIG. 2 is a block diagram illustrating an example signal discriminator included in an example controller that regulates output current indirectly in response to the input voltage, input current, and output voltage in accordance with the teachings of the present disclosure.

FIG. 2 illustrates an example block diagram for the signal discriminator of the controller in FIG. 1. Signal discriminator 140 includes a timer 220, a clock circuit 205, an up/down counter 210, a comparator 230, and a gated output count buffer 255. Comparator 230 has a non-inverting input terminal that receives filtered signal $U_F$ 138 and an inverting input terminal that receives a reference signal $U_{REF}$ 225. Reference signal $U_{REF}$ 225 corresponds to the desired level of the average value of output current $I_O$ 122, e.g., the reference REF. Comparator 230 outputs a logic signal indicating whether filtered signal $U_F$ 138 is greater or less than reference signal $U_{REF}$ 225. In one example, comparator output $U_C$ 235 is logic high when filtered signal $U_F$ 138 is greater than reference signal $U_{REF}$ 225 and logic low when filtered signal $U_F$ 138 is less than reference signal $U_{REF}$ 225.

Up/down counter 210 receives comparator output $U_C$ 235, a clock signal that is output by a clock circuit 205, and a timer signal 260. In the illustrated example, timer signal 260 is a periodic pulse with a period equal to the period of filtered signal $U_F$ 138 (the half line cycle) and generated by a timer circuit 220. In another example, timer signal 260 may be periodic with a period equal to two or more periods of filtered signal $U_F$ 138. Up/down counter 210 has a RESET input that receives timer signal 260. Up/down counter 210 uses timer signal 260 to reset count signal COUNT 250 at its output. In one example, up/down counter 210 resets count signal COUNT 250 to zero at every pulse of timer signal 260. That is, count signal COUNT 250 is reset to zero at every period of timer signal 260. Up/down counter 210 counts up or down at every period of the clock signal in response comparator output $U_C$ 235. In one example, up/down counter 210 counts up when comparator output $U_C$ 235 indicates that filtered signal $U_F$ 138 is greater than reference signal $U_{REF}$ 225 (e.g., when comparator output $U_C$ 235 is logic high) and counts down when comparator output $U_C$ 235 indicates that filtered signal $U_F$ 138 is less than reference signal $U_{REF}$ 225 (e.g., when comparator output UC 235 is logic low). The period of the clock signal may be several orders of magnitude (e.g., 1000) smaller than the period of timer signal 260 ($T_L/2$). As such, up/down counter 210 can update count signal COUNT 250 many times (e.g., 1000) during the period of timer signal 260. In one example, timer circuit 220 generates timer signal 260 independent of the signals within signal discriminator 140. In another example, timer circuit 220 may be coupled to receive comparator output $U_C$ 235 and output a pulse in timer signal 260 when comparator output $U_C$ 235 transitions from logic low to logic high indicating that filtered signal $U_F$ 138 has crossed the reference REF from a level below to a level above. In this case, if filtered signal $U_F$ 138 does not cross the reference REF within a certain time period, which may be referred to as a timeout period, after the previous pulse in timer signal 260, timer circuit 220 may output a new pulse in timer signal 260 at the end of the timeout period to reset count signal COUNT 250.

Gated output count buffer 255 receives count signal COUNT 250 and has a GATE input that receives timer signal 260. Gated output count buffer 255 outputs count signal COUNT 250 as error signal $U_{ERR}$ 146. Gated output count buffer 255 is configured to update error signal $U_{ERR}$ 146 with the latest value of count signal COUNT at every pulse of timer signal 260. In other words, in one example, at the beginning of every new half line cycle, error signal $U_{ERR}$ 146 is updated with the latest value of count signal COUNT 250 from the preceding half line cycle. From the time that error signal $U_{ERR}$ 146 is updated until the beginning of the next half line cycle, gated output count buffer 255 keeps error signal $U_{ERR}$ 146 constant. In this manner, signal discriminator 140 outputs error signal $U_{ERR}$ 146 that becomes representative of the difference between the portion of the half line cycle that filtered signal $U_F$ 138 is greater than the reference REF and the portion of the half line cycle that filtered signal $U_F$ 138 is less than the reference REF in accordance with the teachings of the present invention.

Figure 3:
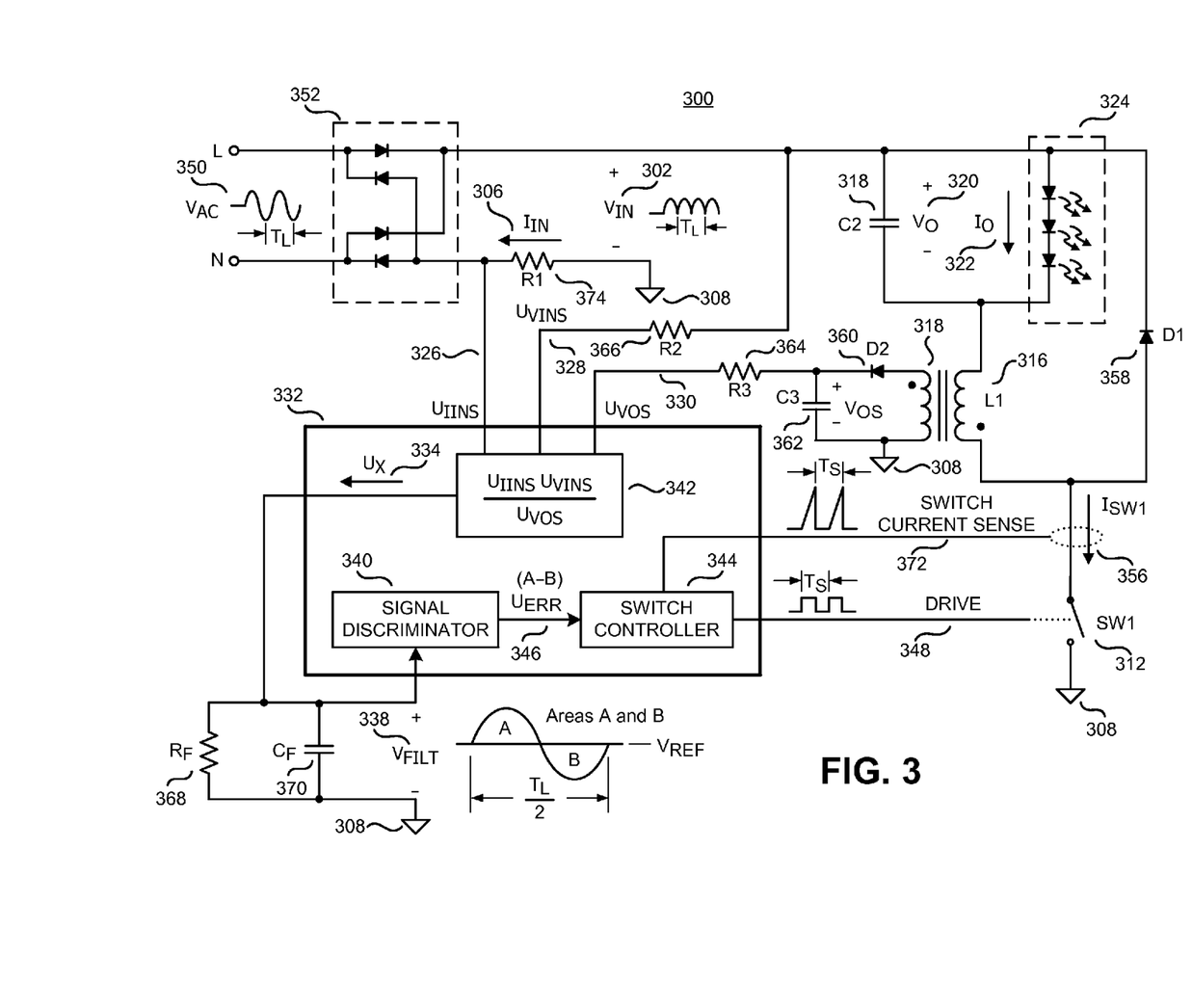
FIG. 3 is a schematic illustrating an example power conversion system with a controller that regulates output current indirectly in response to the input voltage, input current, and output voltage in accordance with the teachings of the present disclosure.

FIG. 3 shows a circuit schematic for an example power conversion system 300 with a controller that regulates output current indirectly. Power conversion system 300 may be one example of power conversion system 100 and controller 332 may be one example of controller 132. Power conversion system 300 has a power conversion block that includes an inductor L1 316, a capacitor C2 318, a diode D1 358, a switch SW1 312, and is configured as a buck converter. Power conversion system 300 includes a rectifier 352 that receives an ac voltage $V_{AC}$ 350 with a period $T_L$ between terminals L and N, and outputs a rectified and filtered ac voltage as input voltage $V_{IN}$ 302 to the power conversion block. In one example, rectifier 350 includes a capacitor (not shown) to filter the rectified ac voltage. Power conversion system 300 is also coupled to a load 324 that includes one or more LEDs.

Controller 332 receives input voltage sense signal $U_{VINS}$ 328 with a resistor R2 366 coupled to the input of the power conversion block and input current sense signal $U_{IINS}$ 326 with a resistor R1 374 coupled between input return 308 and terminal N. Controller 332 receives output voltage sense signal $U_{VOS}$ 330 from sense circuitry that is coupled to inductor L1 316 of the power conversion block. The sense circuitry includes an inductor 318 coupled to inductor L1 316 of the power conversion block, a filter that includes resistor R3 364 and a capacitor C3 362, and a diode D2 360. The sense circuitry rectifies and filters the voltage across inductor 318. The voltage across capacitor C3 362, which may also be referred to as an output sense voltage $V_{OS}$ 362, is representative of output voltage $V_O$ 320 of power conversion system 300. The sense circuitry provides output sense voltage $V_{OS}$ 362 as output voltage sense signal $U_{VOS}$ 330 to controller 332.

Controller 332 also receives a switch current sense signal 372, which is representative of the current $I_{SW1}$ 356 in switch SW1 312. Any one of a variety of ways to sense current, such as for example receiving the voltage across a resistor conducting the current, or for example receiving a scaled current from a current transformer, or for example receiving the voltage across the on-resistance of a MOSFET that conducts the current, may be used to sense current $I_{SW1}$ 356. Controller 332 may use switch current sense signal 372 to detect an overcurrent condition (i.e., determine whether switch SW1 312 is conducting more current than it can handle) and prevent switch SW1 312 from potential damage.

Power conversion system 300 also includes a low-pass filter that includes a resistor $R_F$ 368 and a capacitor $C_F$ 370. The low pass filter receives signal $U_X$ 334 and outputs a filtered voltage $V_{FILT}$ 338 to signal discriminator 340. Filtered voltage $V_{FILT}$ 338 corresponds to filtered signal $U_F$ 138. Resistor $R_F$ 368 can be adjusted to account for the efficiency of the power conversion block. For example, if the efficiency of the power conversion block is lower, a resistor with a lower resistance can be selected as resistor $R_F$ 368 in order to scale the filtered voltage $V_{FILT}$ 338 appropriately such that the average value of output current $I_O$ 322 is regulated at the desired level in accordance with the teachings of the present invention.

Figure 4:
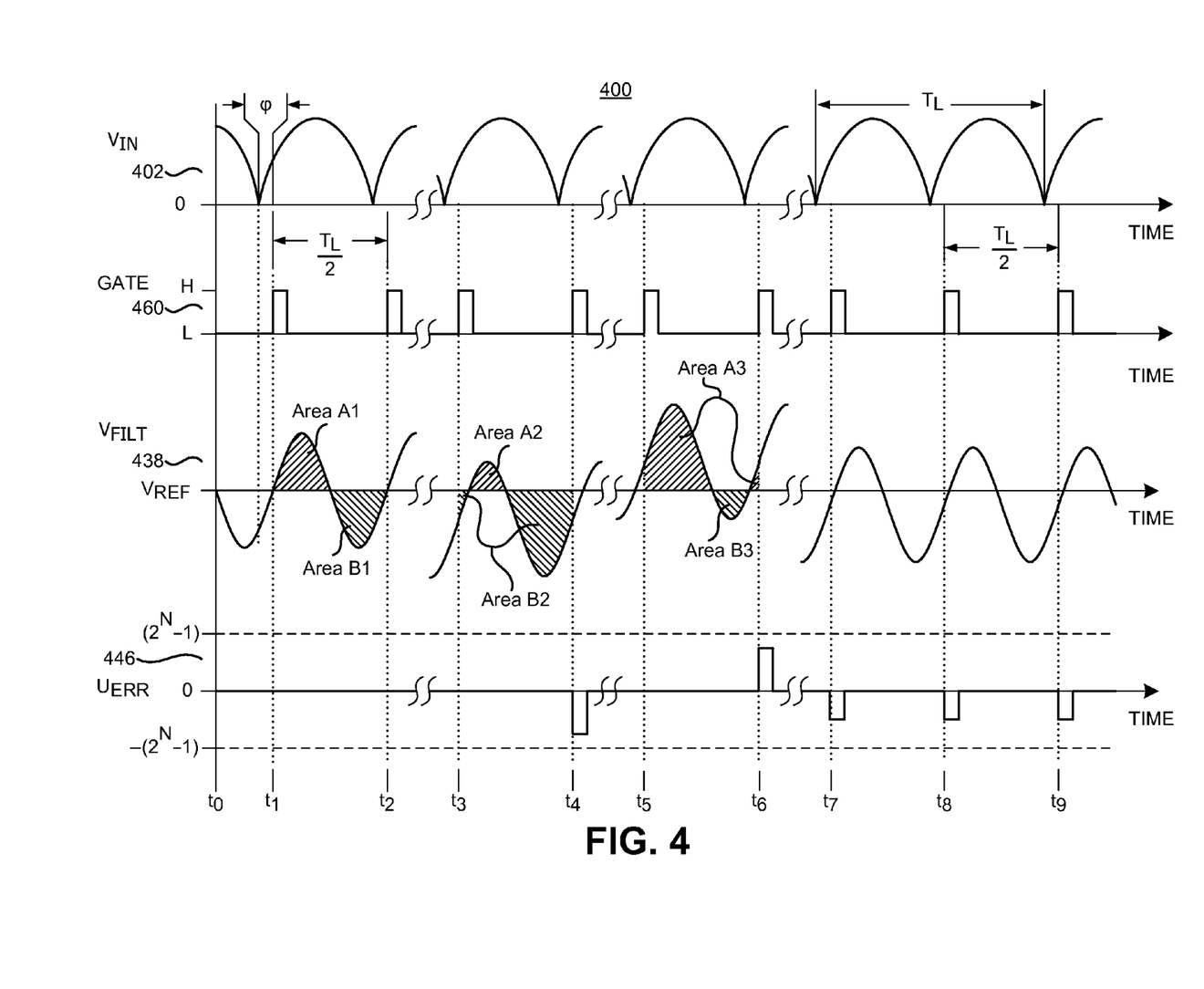
FIG. 4 is a timing diagram illustrating example waveforms of an example power conversion system with a controller that regulates output current indirectly in response to the input voltage, input current, and output voltage in accordance with the teachings of the present disclosure.

FIG. 4 illustrates example waveforms for signals associated with the power conversion system of FIG. 3. Waveform 402 represents input voltage $V_{IN}$ 302, waveform 460 represents timer signal 260 of signal discriminator 340, waveform 438 represents filtered voltage $V_{FILT}$ 338, and waveform 446 represents error signal $U_{ERR}$ 346. Voltage $V_{REF}$ corresponds to the reference REF. Waveform 402 is periodic with a period equal to the half line cycle ($T_L/2$), which is equal to the half the period of ac input voltage $V_{AC}$ 350. Waveform 438 is a sinusoidal signal with a period equal to the half line cycle as well. However, due to filtering of signal $U_X$ 334 by the low-pass filter, waveform 438 may have a phase shift with respect to waveform 402, which is illustrated by time difference ϕ. Waveform 460 is a periodic pulse with a period equal to the half line cycle. As previously mentioned, in the depicted example, timer signal 260 is generated independent of the signals within signal discriminator 140. As a result, waveform 460 may also have a phase shift with respect to waveform 402. These phase shifts do not affect the regulation of average value of output current $I_O$ 322 as long as the period of waveform 438 is equal to the period of output current $I_O$ 322, the period of waveform 460 is equal to one or more periods of waveform 438, and error signal $U_{ERR}$ 346 is updated at every period of waveform 460.

In response to every pulse in waveform 460, signal discriminator 340 updates waveform 446 with a number that represents—for the immediately preceding period of waveform 460—the difference between the duration that waveform 438 is above the voltage $V_{REF}$ and the duration that waveform 438 is below the voltage $V_{REF}$. As previously mentioned, in some cases, this number may also represent— for the immediately preceding period of waveform 460—the difference between the area of a portion of waveform 438 that is greater than the voltage $V_{REF}$ and the area of a portion of waveform 438 that is less than the voltage $V_{REF}$. As an example, time period between time t1 and t2 represents one example period of waveform 460 where area A1, which corresponds to the area of the portion of waveform 438 that is greater than the voltage $V_{REF}$, is equal to area B1, which corresponds to the area of the portion of waveform 438 that is less than the voltage $V_{REF}$. When the difference between area A1 and B1 is zero, which may indicate that the average value of waveform 438 is equal to the voltage $V_{REF}$ and hence, the average value of output current $I_O$ 322 is being regulated at the desired level in accordance with the teachings of the present invention. As a result, waveform 446 becomes zero for the next period starting at time t2.

Time period between time t3 and t4 represents another period of waveform 460 where the area of the portion of waveform 438 that is greater than the voltage $V_{REF}$, illustrated by area A2, is less than the area of the portion of waveform 438 that is less than the voltage $V_{REF}$, illustrated by area B2. This may indicate that the average value of waveform 438 is less than the voltage $V_{REF}$ and hence, the average value of output current $I_O$ 322 is below the desired level. As such, waveform 446 becomes a negative number for the next period starting at time t4. The absolute value of this negative number may correspond to the absolute value of the difference between area A2 and B2.

The time period between time t5 and t6 represents yet another period of waveform 460 where the area of the portion of waveform 438 that is greater than the voltage $V_{REF}$, illustrated by area A3, is greater than the area of the portion of waveform 438 that is less than the voltage $V_{REF}$, illustrated by area B3. This may indicate that the average value of waveform 438 is greater than the voltage $V_{REF}$ and hence, the average value of output current $I_O$ 322 is above the desired level. As such, waveform 446 becomes a positive number for the next period starting at time t6. This positive number may correspond to the absolute value of the difference between area A3 and B3.

In response to receiving a negative or a positive number as error signal $U_{ERR}$ 446, switch controller 344 can adjust one or more properties of drive signal DRIVE 348 to reduce—in the ensuing period of waveform 460—the difference between the area of the portion of waveform 438 that is greater than the voltage $V_{REF}$ and the area of the portion of waveform 438 that is less than the voltage $V_{REF}$, thereby bringing error signal $U_{ERR}$ 446 closer to zero.

Figure 5:
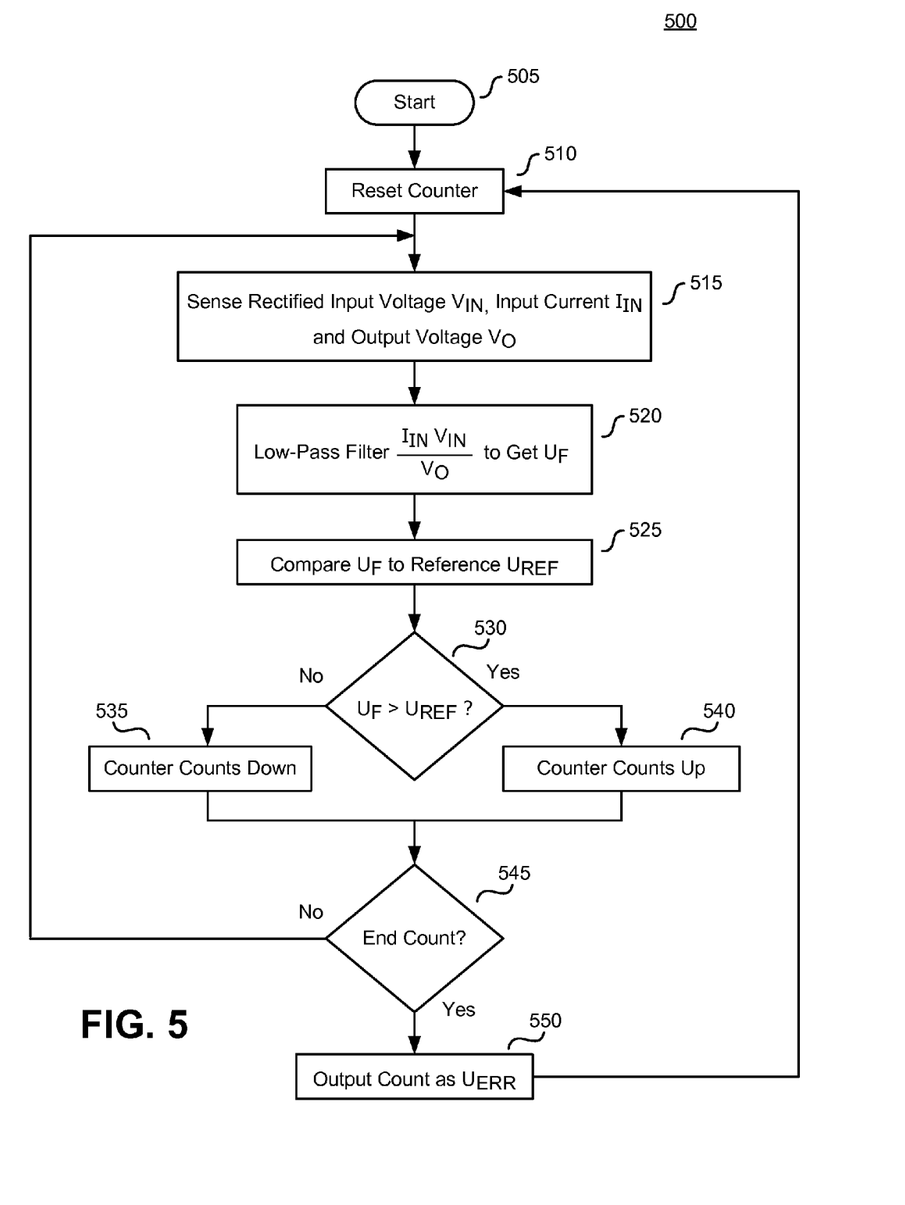
FIG. 5 is an example flow chart illustrating an example process of generating an error signal in an example power conversion system with a controller that regulates output current indirectly in response to the input voltage, input current, and output voltage in accordance with the teachings of the present disclosure.

FIG. 5 is an example flow chart 500 illustrating an example process of generating an error signal in an example power conversion system with a controller that regulates output current indirectly in response to the input voltage, input current, and output voltage in accordance with the teachings of the present disclosure. The error signal may represent the difference between the average value of the output current of the power conversion system and a desired average value of the output current.

As shown in the example depicted in FIG. 5, processing starts at process block 505. At process block 510, the counter is reset. Process block 515 shows that the input voltage $V_{IN}$, the input current $I_{IN}$, and the output voltage $V_O$ of the power conversion system are sensed. Process block 520 shows that the product of the sensed input voltage $V_{IN}$ and the sensed input current $I_{IN}$ divided by the output voltage $V_O$ is then filtered to generated a filtered signal $U_F$. Process block 525 shows that the filtered signal $U_F$ is then compared to a reference signal $U_{REF}$. Decision block 530 shows that if the filtered signal $U_F$ is greater than the reference signal $U_{REF}$, then the counter counts up, as shown in process block 540. Otherwise, the counter counts down, as shown in process block 535. Decision block 545 shows that it is determined whether the counter has ended counting. If so, then process block 550 shows that the latest count of the counter is output as error signal UERR and processing then loops back to process block 510, where the counter is reset. If decision block 545 has determined that the counter has not ended counting, then processing loops back to process block 515, where the input voltage $V_{IN}$, the input current $I_{IN}$, and the output voltage $V_O$ of the power conversion system are again sensed. In this manner, an error signal that is representative of the difference between the average value of the output current of the power conversion system and a desired average value of the output current can be generated.

In one example, the power conversion system and controller processing described in FIG. 5 may correspond to the power conversion system and controller examples described above in FIGS. 1-4. For example, process block 510 may be performed by up/down counter 210 in response to receiving timer signal 260. Resistors R1 374 and R2 366, and the sense circuitry may be used to perform process block 515. Multiplier 142/342 in conjunction with low-pass filter 136/the low-pass filter illustrated in FIG. 3 may perform process block 520. Signal discriminator 140/340 may perform process blocks 525, 530, 535, 540, 545, and 550.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A controller for use in a power conversion system, comprising:
    a multiplier block coupled to receive an input voltage signal representative of a sensed input voltage of the power conversion system, an input current signal representative of a sensed input current of the power conversion system, and an output voltage signal representative of a sensed output voltage of the power conversion system, wherein the multiplier block is coupled to output a multiplier block output signal responsive to a product of the input voltage signal and the input current signal divided by the output voltage signal;
    a signal discriminator coupled to output an error signal in response to the multiplier block output signal, wherein the error signal is representative, for one or more periods of the multiplier block output signal, of a difference between a portion of the multiplier block output signal that is greater than a reference signal and a portion of the multiplier block output signal that is less than or equal to the reference signal; and a switch controller coupled to generate a drive signal in response to the error signal to control switching of a power switch of the power conversion system to regulate an average output current of the power conversion system.

2. The controller of claim 1 wherein a low pass filter is coupled between the multiplier block and the signal discriminator, wherein the low pass filter is coupled to generate a filtered multiplier block output signal in response to the multiplier block output signal, wherein the switch controller is coupled to receive the filtered multiplier block output signal.

3. The controller of claim 1 wherein the sensed input voltage is a rectified line voltage coupled to be received from a rectifier, wherein the signal discriminator is coupled to update the error signal every half line cycle of the rectified line voltage.

4. The controller of claim 1 wherein the signal discriminator comprises:
a comparator having a first input coupled to receive the reference signal, and a second input coupled to receive a filtered multiplier block output signal representation of the multiplier block output signal;
a counter coupled to an output of the comparator, wherein the counter is coupled to be incremented or decremented in response to the output of the comparator; and
an output count buffer coupled to receive a count signal from an output of the counter, wherein the output count buffer coupled to store the count signal and update the error signal in response to the stored count signal.

5. The controller of claim 4 wherein the comparator is coupled to increment the counter in response to the filtered multiplier block output signal being greater than the reference signal, and wherein the comparator is coupled to decrement the counter in response to the filtered multiplier block output signal being less than or equal to the reference signal.

6. The controller of claim 4 wherein the error signal is a binary number.

7. The controller of claim 4 wherein the signal discriminator further comprises:
a timer coupled to generate a timer signal having a timer period substantially equal to a half line cycle time of a rectified line voltage coupled to be received from a rectifier from which the sensed input voltage is coupled to be sensed, wherein the timer signal is coupled to be received at a reset input of the counter, and wherein the timer signal is further coupled to be received at a gate input of the output count buffer; and
a clock coupled to generate a clock signal coupled to clock the counter, wherein the counter is coupled to be incremented or decremented in response to the output of the comparator and in response to the clock signal from the clock.

8. The controller of claim 7 wherein a clock period of the clock signal is substantially less than the timer period of the timer signal.

9. The controller of claim 7 wherein the output count buffer is coupled to store the count signal and update the error signal every half line cycle of the rectified line voltage in response to the timer signal.

10. The controller of claim 9 wherein the error signal is substantially equal to a difference between a duration of time that the filtered multiplier block output signal that is greater than the reference signal and a duration of time that the filtered multiplier block output signal that is less than or equal to the reference signal for every half line cycle of the rectified line voltage.

11. The controller of claim 1 wherein the switch controller is further coupled to receive a switch current sense signal representative of a switch current through the power switch, wherein the switch controller is further coupled to generate the drive signal in response to the error signal and the switch current sense signal to control switching of the power switch of the power conversion system to regulate the average output current of the power conversion system.

12. The controller of claim 1 wherein a load to be coupled to an output of the power conversion system includes a light emitting diode, wherein the switch controller coupled to generate the drive signal in response to the error signal to control switching of the power switch of the power conversion system to regulate the average output current through the load.

13. The controller of claim 1 wherein the multiplier block is coupled to receive the output voltage signal from a sense winding of an energy transfer element of the power conversion system, wherein the switch controller is coupled to generate the drive signal to control switching of the power switch to control a transfer of energy through the energy transfer element to regulate the average output current of the power conversion system.

14. The controller of claim 13 wherein the energy transfer element comprises coupled inductors including the sense winding coupled to the multiplier block, and an inductor coupled to the power switch.

15. A method for regulating an average output current through a load coupled to an output of a power conversion system, comprising:
resetting a count signal of a counter at a beginning of every half line cycle of a rectified line voltage received at an input of the power conversion system;
repeating during every half line cycle:
sensing a rectified input voltage of the power conversion system;
sensing an input current of the power conversion system;
sensing an output voltage of the power conversion system;
multiplying the rectified input voltage, the input current, and a reciprocal of the output voltage to determine a multiplier block output signal;
low pass filtering the multiplier block output signal;
comparing the filtered multiplier block output signal with a reference signal;
incrementing the counter if the filtered multiplier block output signal is greater than the reference signal; and
decrementing the counter if the filtered multiplier block output signal is less than or equal to the reference signal;
updating an error signal to equal the count signal at an end of every half line cycle; and
switching a power switch of the power conversion system in response to the error signal to control a transfer energy from the input of the power conversion system to the load coupled to the output of the power conversion system.

16. The method of claim 15 further comprising:
receiving a switch current sense signal representative of a switch current through the power switch; and
switching the power switch of the power conversion system in response to the error signal and the switch current sense signal to control the transfer energy from the input of the power conversion system to the load coupled to the output of the power conversion system.

17. The method of claim 15 wherein switching the power switch of the power conversion system in response to the error signal to control the transfer energy from the input of the power conversion system to the load coupled to the output of the power conversion system comprises generating a drive signal coupled to be received by the power switch in response to the error signal.

18. The method of claim 15 wherein generating the drive signal coupled to be received by the power switch in response to the error signal comprises modulating a pulse width of the drive signal in response to the error signal.

19. The method of claim 15 wherein generating the drive signal coupled to be received by the power switch in response to the error signal comprises modulating a frequency of the drive signal in response to the error signal.

20. The method of claim 15 wherein the error signal is a binary number.

* * * * *